Jan. 13, 1925.
O. G. PACK ET AL
1,522,904
WHEEL ADVERTISING DISK ATTACHMENT
Filed Jan. 21, 1924
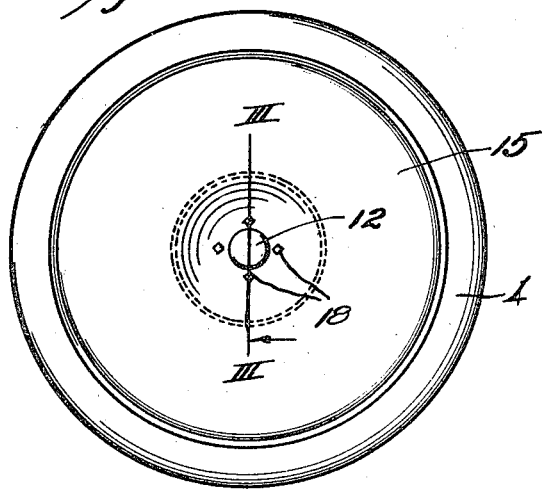
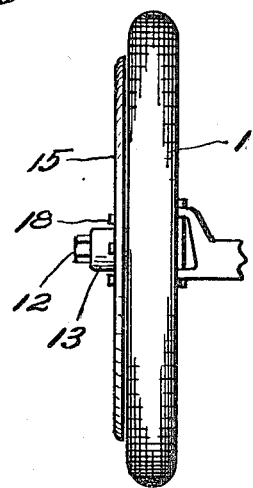
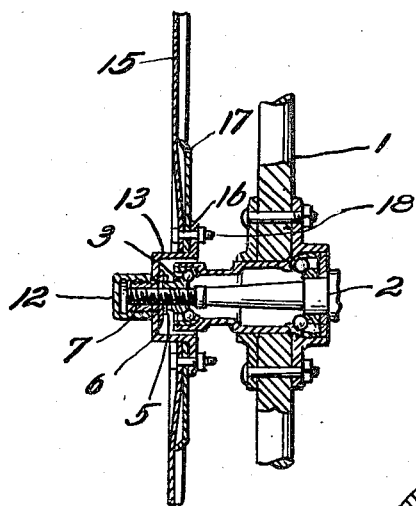
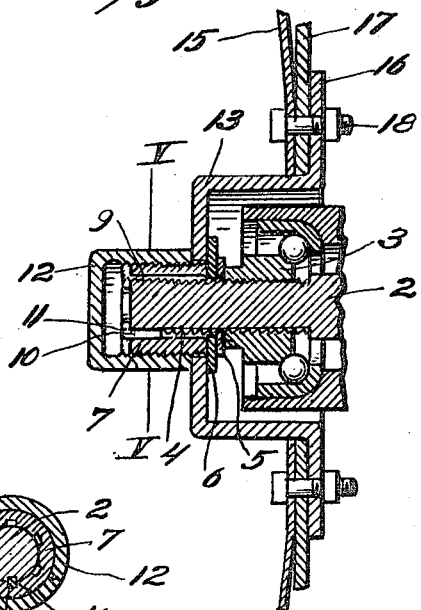
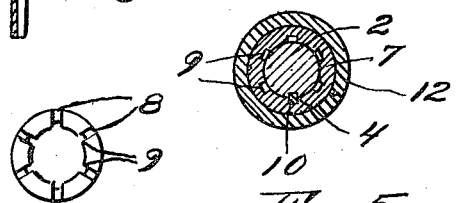
Inventors:
O. G. Pack
and A. W. Griffin Patented Jan. 13, 1925.

1,522,904

UNITED STATES PATENT OFFICE.

ORVILLA G. PACK AND ALVAH M. GRIFFIN, OF KANSAS CITY, MISSOURI; SAID GRIFFIN ASSIGNOR TO SAID PACK.

WHEEL ADVERTISING-DISK ATTACHMENT.

Application filed January 21, 1924. Serial No. 687,589.

*To all whom it may concern:*

Be it known that we, ORVILLA G. PACK and ALVAH M. GRIFFIN, citizens of the United States, and residents of Kansas City, county of Jackson, State of Missouri, have invented a certain new and useful Improvement in Wheel Advertising-Disk Attachments, of which the following is a complete specification.

This invention relates to advertising disk attachments for vehicle wheels, and our object is to produce an improved mounting for an advertising disk on the front wheels of certain types of motor cars in such a manner that the disk shall be firmly maintained against rotation when the car is in motion, without the use of retaining arms or the like fastened to a stationary part of the automobile.

Another object is to produce a device of the character described which is of simple, strong, durable, efficient and inexpensive construction; and in order to be fully understood, reference is to be had to the accompanying drawing, in which:—

Figure 1 is a face view of a wheel equipped with a disk mounting embodying the invention.

Figure 2 is an edge view of the same.

Figure 3 is a section on the line III—III of Figure 1.

Figure 4 is a view similar to Figure 3 but on an enlarged scale and with the wheel omitted.

Figure 5 is a section on the line V—V of Figure 4.

Figure 6 is an end view of a castellated internally and externally threaded sleeve forming a part of the invention.

In the said drawing, where like reference characters identify corresponding parts in all of the figures, 1 represents an automobile wheel, 2 the spindle therefor and 3 the bearing cone which is adjustable on the threaded end of the spindle 2, as common in the art. The spindle 2, as usual, is formed with a longitudinally extending slot or key-way 4, and is provided with a washer 5, having a tongue engaged in the slot of the spindle, said washer being thus held against rotation and being in abutment with the face of the adjustable cone member 3, as conventional.

Adapted to be loosely received on the spindle and in abutting relation with the washer 5, is a washer 6 of somewhat greater diameter than the former, and held in position through engagement with one end of an internally and externally threaded sleeve 7, screwed on the spindle 2. Upon reference to Figure 6, it will be noted that the sleeve 7 is of the castellated type, i. e., is provided at its outer end with a series of notches or kerfs 8, for engagement with a spanner wrench, and is, moreover, provided with a series of internal longitudinally extending grooves or slots 9, whereby a series of adjustments are made available so that one of said grooves or slots shall always register with the slot 4 of the spindle. Snugly received within registering slots 4 and 9 is a locking key 10, having its outer end inturned as at 11, for convenience of removal. It will be evident that the key 10, when inserted in position will reliably lock the sleeve against unscrewing movement, and will, therefore, properly maintain the cone bearing 3 in any desired position of adjustment.

The advertising disk is secured in position by means of a disk casting comprising an internally threaded cap 12 in engagement with the external threads of the sleeve 7, and preferably formed integrally with said cap, is a second cap member 13 of sufficient diameter to receive the outer end of the hub of the wheel, as shown most clearly in Figure 4.

The advertising disk 15, is formed with a central opening sufficiently large to receive the cap 13, and interposed between the disk and a circumferential flange 16 formed on the cap, is a circular reinforcing plate 17, having an out-turned circumferential flange for abutment against the disk, see Figure 3. The parts are tightly clamped to the flange 16 of the cap, by means of a series of bolts 18, and in this action, it will be noted that the plate 17 being of substantially rigid construction, will cause the disk to be dished, thereby imposing a clamping strain which effectually overcomes any tendency of the parts to become loose and rattle, and it will be apparent that, as the spindle is non-rotatable, the advertising disk will be mainatined in any desired position without the use of stabilizing arms, weights, or the like.

When it is desired to adjust a disk so that it shall be in proper horizontal position, the cap 12 and key 10 are removed. The threaded sleeve 7 may now be adjusted until another of its slots 9 registers with the spindle slot 4, when the key 10 and disk casting are returned to position. It will be evident that the cap 12 must be screwed home as tightly as possible so that it may be securely held against accidental unscrewing movement, which would permit the disk to turn and display advertising matter appearing on the disk, in an angular or inverted position instead of in a horizontal or readable position.

From the above description, it will be apparent that we have produced a device of the character described, which possesses all of the features of advantage set forth as desirable; and while we have described and claimed the preferred embodiment of the same, we reserve the right to make all changes properly falling within the spirit and scope of the appended claims.

We claim:

1. The combination of a revoluble wheel, a fixed spindle for said wheel, an internally and externally threaded sleeve screwed on said spindle, an advertising disk fitted on said sleeve, and means threaded on said sleeve for clamping engagement with the disk to hold it stationary.

2. The combination of a revoluble wheel, a casting non-rotatably carried by the spindle of said wheel, a flange on said casting, an advertising disk, a reinforcing plate interposed between said flange and disk, and means for securing the disk and plate in clamped relation to said flange.

3. The combination of a revoluble wheel, a casting non-rotatably carried by the spindle of said wheel, a flange on said casting, an advertising disk, a reinforcing plate interposed between said flange and said disk and having an out-turned circumferential flange in abutment with the inner face of the disk, and clamping means for clamping the disk and plate tightly to said flange and causing the flange of the plate to dish said disk.

4. The combination of a revoluble wheel, a longitudinally-slotted fixed spindle for said wheel, an adjustable cone bearing for said wheel, a washer fitted against said cone bearing and having a tongue in engagement with said slot, a sleeve threaded on said spindle and maintaining clamping pressure against said washer and having an internal slot adapted to register with the spindle slot, a locking key received within said registering slots, and an advertising disk carried by said sleeve.

In witness whereof we hereunto affix our signatures.

ORVILLA G. PACK.
ALVAH M. GRIFFIN.